US012152555B2

(12) United States Patent
Baur et al.

(10) Patent No.: US 12,152,555 B2
(45) Date of Patent: Nov. 26, 2024

(54) AIR PRESSURE ENERGY RECOVERY AND AIR/FUEL/REFORMATE STORAGE DURING VEHICLE DECELERATION FOR ACTIVE PRECHAMBER OPERATION

(71) Applicant: ARAMCO SERVICES COMPANY, Houston, TX (US)

(72) Inventors: Andrew Baur, Whitmore Lake, MI (US); Xin Yu, New Hudson, MI (US); Alexander K. Voice, Detroit, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 35 days.

(21) Appl. No.: 18/068,644

(22) Filed: Dec. 20, 2022

(65) Prior Publication Data

US 2024/0200518 A1 Jun. 20, 2024

(51) Int. Cl.
| | |
|---|---|
| *F02M 26/37* | (2016.01) |
| *F02B 19/16* | (2006.01) |
| *F02D 41/00* | (2006.01) |
| *F02D 41/12* | (2006.01) |
| *F02M 26/12* | (2016.01) |

(Continued)

(52) U.S. Cl.
CPC ............ *F02M 26/37* (2016.02); *F02B 19/16* (2013.01); *F02D 41/005* (2013.01); *F02D 41/0077* (2013.01); *F02D 41/123* (2013.01); *F02M 26/12* (2016.02); *F02M 26/15* (2016.02); *F02M 26/16* (2016.02); *F02M 26/35* (2016.02); *F02M 26/41* (2016.02)

(58) Field of Classification Search
CPC ........ F02M 26/37; F02M 26/12; F02M 26/15; F02M 26/16; F02M 26/35; F02M 26/41; F02B 19/16; F02D 41/005; F02D 41/0077; F02D 41/123
See application file for complete search history.

(56) References Cited

U.S. PATENT DOCUMENTS

| | | |
|---|---|---|
| 3,665,902 A | 5/1972 | Bloomfield |
| 4,424,780 A | 1/1984 | Trucco |

(Continued)

FOREIGN PATENT DOCUMENTS

| | | |
|---|---|---|
| CN | 112240239 A | 1/2021 |
| DE | 20 2014 102098 U1 | 7/2014 |

(Continued)

OTHER PUBLICATIONS

Kopasz, John P., et al., "Challenges in Reforming Gasoline: All Components are Not Created Equal", SAE International, SAE Technical Paper Series 2001-01-1915, May 7-9, 2001 (9 pages).

(Continued)

*Primary Examiner* — Xiao En Mo
(74) *Attorney, Agent, or Firm* — Osha Bergman Watanabe & Burton LLP

(57) ABSTRACT

An engine system including an engine is disclosed. The engine includes a combustion chamber having an intake port and an exhaust port, a piston movably disposed in the combustion chamber, and a prechamber adjacent to and in fluid communication with the combustion chamber. The engine system further includes an exhaust line fluidly connected to the exhaust port, a storage tank fluidly connected to the prechamber via a purge line, and a prechamber valve provided along the purge line.

19 Claims, 12 Drawing Sheets

(51) Int. Cl.
| | |
|---|---|
| *F02M 26/15* | (2016.01) |
| *F02M 26/16* | (2016.01) |
| *F02M 26/35* | (2016.01) |
| *F02M 26/41* | (2016.01) |

(56) References Cited

U.S. PATENT DOCUMENTS

| | | | |
|---|---|---|---|
| 6,994,073 | B2 | 2/2006 | Tozzi et al. |
| 7,021,275 | B2 | 4/2006 | Durling |
| 7,082,920 | B2 | 8/2006 | Robinet et al. |
| 7,392,795 | B2 | 7/2008 | Nagamine et al. |
| 9,391,430 | B2 | 7/2016 | Berkemeier et al. |
| 9,932,883 | B2 | 4/2018 | Iwai et al. |
| 9,970,407 | B2 | 5/2018 | Idicheria et al. |
| 10,233,809 | B2 | 3/2019 | Henry |
| 10,886,706 | B2 | 1/2021 | Zhou |
| 10,947,948 | B1* | 3/2021 | Glugla ............... F02P 15/02 |
| 10,989,129 | B1* | 4/2021 | Glugla ............... F02F 11/00 |
| 11,060,443 | B1* | 7/2021 | Thomas ............. F02M 61/14 |
| 11,066,978 | B1* | 7/2021 | Glugla ............. F02B 19/1085 |
| 11,156,198 | B1* | 10/2021 | Glugla ............... F02P 3/05 |
| 11,248,551 | B1* | 2/2022 | VanDerWege ....... F02B 19/108 |
| 11,319,866 | B1* | 5/2022 | VanDerWege ....... F02M 23/00 |
| 2005/0053534 | A1 | 3/2005 | Liu et al. |
| 2005/0103543 | A1 | 5/2005 | Liu et al. |
| 2006/0048502 | A1 | 3/2006 | Washington et al. |
| 2008/0098984 | A1 | 5/2008 | Sakamaki |
| 2009/0322098 | A1* | 12/2009 | Cohen ............... B60L 50/62 |
| | | | 290/1 A |
| 2012/0312087 | A1 | 12/2012 | Inuzuka et al. |
| 2013/0180498 | A1 | 7/2013 | Rabhi |
| 2015/0166913 | A1 | 6/2015 | Brody et al. |
| 2016/0076488 | A1 | 3/2016 | Henry |
| 2018/0363539 | A1* | 12/2018 | Shelby ............... F02B 19/12 |
| 2021/0156325 | A1* | 5/2021 | Glugla ............... F02D 9/02 |
| 2021/0246823 | A1* | 8/2021 | Glugla ............... F02B 19/12 |
| 2021/0262408 | A1* | 8/2021 | Glugla ............. F02D 41/3094 |

FOREIGN PATENT DOCUMENTS

| | | |
|---|---|---|
| DE | 102015221286 B4 | 8/2020 |
| DE | 102020134582 A1 | 6/2022 |
| EP | 2 569 524 A1 | 3/2013 |
| FR | 2 928 700 A1 | 9/2009 |
| FR | 2928699 A1 | 9/2009 |
| JP | 2009167862 A | 7/2009 |
| JP | 2011-99403 A | 5/2011 |
| JP | 2011-99404 A | 5/2011 |
| WO | 2013/117857 A2 | 8/2013 |
| WO | 2015/138987 A1 | 9/2015 |
| WO | 2019/141728 A1 | 7/2019 |
| WO | 2019/157581 A1 | 8/2019 |

OTHER PUBLICATIONS

Brookshear, D. William, et al., "Catalytic Steam and Partial Oxidation Reforming of Liquid Fuels for Application in Improving the Efficiency of Internal Combustion Engines", ACS Publications, vol. 32, pp. 2267-2281, 2018 (15 pages).

Stone, Richard, et al., "Analysis of Combustion and Particulate Emissions when Hydrogen is Aspirated into a Gasoline Direct Injection Engine", SAE International, Paper 2010-01-0580, Apr. 12, 2010 (13 pages).

Gerty, Michael D., et al., "An Investigation of Gasoline Engine Knock Limited Performance and the Effects of Hydrogen Enhancement", SAE International, SAE Technical Paper Series 2006-01-0228, pp. 1-21, Apr. 3-6, 2006 (23 pages).

Gukelberger, Raphael, et al., "Alternative Fuel Testing on a Port Fuel Injected LPL EGR and D-EGR® Engine", SAE International, Paper 2016-01-2170, Oct. 17, 2016 (14 pages).

Kirwan, John E., et al., "Advanced Engine Management Using On-Board Gasoline Partial Oxidation Reforming for Meeting Super-ULEV (SULEV) Emissions Standards", SAE International, SAE Technical Paper Series 1999-01-2927, pp. 1-14, Aug. 17-19, 1999 (16 pages).

Chadwell, C., et al., "A Demonstration of Dedicated EGR on a 2.0 L GDI Engine", SAE International, Paper 2014-01-1190, pp. 434-437, Apr. 1, 2014 (4 pages).

Szybist, James P., et al., "The Reduced Effectiveness of EGR to Mitigate Knock at High Loads in Boosted SI Engines", SAE International, pp. 2305-2309, Sep. 4, 2017 (4 pages).

Alger, Terrence, et al., "The Interaction between Fuel Anti-Knock Index and Reformation Ratio in an Engine Equipped with Dedicated EGR", SAE International, Paper 2016-01-0172, pp. 786-795, Apr. 5, 2016 (10 pages).

Newkirk, Marc S., et al., "The Boston Reformed Fuel Car", SAE International, Technical Paper 720670, Feb. 1, 1972 (4 pages).

Ashida, Koichi, et al., "Study of an On-board Fuel Reformer and Hydrogen-Added EGR Combustion in a Gasoline Engine", SAE International, Paper 2015-01-0902, pp. 358-366, Apr. 14, 2015 (9 pages).

Gukelberger, Raphael, et al., "LPL EGR and D-EGR® Engine Concept Comparison Part 2: High Load Operation", SAE International, Paper 2015-01-0781, pp. 547-556, Apr. 14, 2015 (10 pages).

Gukelberger, Raphael, et al., "LPL EGR and D-EGR® Engine Concept Comparison Part 1: Part Load Operation", SAE International, Paper 2015-01-0783, pp. 570-582, Apr. 14, 2015 (13 pages).

Tully, Edward J., et al., "Lean-Burn Characteristics of a Gasoline Engine Enriched with Hydrogen from a Plasmatron Fuel Reformer", SAE Technical Paper Series 2003-01-0630, Mar. 3-6, 2003 (16 pages).

Alger, Terrence, et al., "Impact of EGR Quality on the Total Inert Dilution Ratio", SAE International, Paper 2016-01-0173, pp. 796-806, Apr. 5, 2016 (11 pages).

Han, Taehoon, et al., "Effect of Syngas (H2/CO) on SI Engine Knock under Boosted EGR and Lean Conditions", SAE International, pp. 960-969, Mar. 28, 2017 (11 pages).

International Search Report and Written Opinion of the International Searching Authority issued Dec. 1, 2022 in corresponding International (PCT) Application No. PCT/US2022/042231.

U.S..Office Action Issued in Corresponding U.S. Appl. No. 17/462,904, Mailed on Jan. 6, 2023, 17 pages.

U.S..Office Action Issued in Corresponding U.S. Appl. No. 17/462,904, Mailed on Mar. 21, 2023, 8 pages.

U.S..Office Action Issued in Corresponding U.S. Appl. No. 17/462,662, Mailed on Mar. 15, 2022, 10 pages.

International Preliminary Report on Patentability issued in corresponding International Application No. PCT/US2022/042216; mailed Mar. 14, 2024 (8 pages).

* cited by examiner

AIR PRESSURE ENERGY RECOVERY AND AIR/FUEL/REFORMATE STORAGE DURING VEHICLE DECELERATION FOR ACTIVE PRECHAMBER OPERATION

BACKGROUND

Internal combustion engines may generally operate by combusting a fuel mixture within a combustion chamber, where the combustion may force movement of one or more components in the engine. A typical internal combustion engine may include multiple cylinders defining the combustion chambers within an engine block, where combustion within a cylinder moves an internal piston, which may in turn move a crankshaft of the engine. A fuel mixture may be directed through an inlet into the combustion chamber and combusted.

Combustion within a combustion chamber of an internal combustion engine may be generated using different mechanisms, such as using high pressure and high temperature conditions or using an ignition device. A common ignition device set up requires a continuous ignition source, or spark, to be produced such that combustion is created by sparking an air and fuel mixture in the combustion chamber of the engine. Conventionally, the spark is created by energizing a copper ignition rod and placing the energized ignition rod within a set distance to a grounded nickel or iridium plate, where the electrical difference between the energized ignition rod and the grounded plate creates a continuous spark. Alternatively, a portion of the air and fuel mixture may be ignited in a pre-combustion chamber (also referred to as a prechamber), where the air and fuel mixture is ignited and the resulting combustion reaction is released into the main combustion chamber to ignite the remainder of the air and fuel mixture.

After combustion within the combustion chamber, the combustion products may exit an outlet of the combustion chamber as exhaust. Some internal combustion engines use exhaust gas recirculation (EGR) techniques that recirculate a portion of an engine's exhaust back to the combustion chamber for mixture with the fuel. By recirculating exhaust gases back to the combustion chamber of an internal combustion engine, EGR systems may be used to dilute the amount of oxygen present during combustion, thereby lowering combustion temperatures in the combustion chamber and lowering nitrous oxides (NOx) emissions from the engine. However, too much dilution may result in unreliable ignition, thereby limiting the dilution tolerance of the engine.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an engine system. The engine system may include an engine comprising a combustion chamber, having an intake port and an exhaust port, and a piston movably disposed in the combustion chamber. The engine system may further include a prechamber adjacent to and in fluid communication with the combustion chamber, an exhaust line fluidly connected to the exhaust port, a storage tank fluidly connected to the prechamber via a purge line, and a prechamber valve provided along the purge line.

In another aspect, embodiments disclosed herein relate to a method. The method may include providing an engine with a combustion chamber fluidly connected to a prechamber and providing a storage tank fluidly connected to the prechamber via a purge line. The method may also include charging the storage tank with gas from the combustion chamber to a desired pressure using a prechamber valve during a deceleration fuel cut off (DFCO) period of the engine and opening the prechamber valve. The method may further include discharging the gas from the storage tank, directing the discharged gas through the purge line to the prechamber, and purging the prechamber.

In yet another aspect, embodiments disclosed herein relate to a method. The method may include providing an engine with a combustion chamber fluidly connected to a prechamber and fluidly connected to a storage tank via an exhaust line and performing a fuel reforming process. The method may also include charging the storage tank with gas to a desired pressure using a prechamber valve during a deceleration fuel cut off (DFCO) period of the engine, opening the prechamber valve, and discharging the gas from the storage tank. The method may further include directing the gas through a purge line to the prechamber and purging the prechamber.

Other aspects and advantages of the claimed subject matter will be apparent from the following description and the appended claims.

BRIEF DESCRIPTION OF DRAWINGS

Specific embodiments of the disclosed technology will be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

In one aspect, embodiments disclosed herein relate to methods and systems that divert gas (e.g., air) from an engine to a storage tank, where the diverted gas may be accumulated in the storage tank, thereby increasing the pressure in the storage tank. Such pressurized gas may then be used for engine prechamber purging.

According to embodiments of the present disclosure, diverted gas may be accumulated in a storage tank during deceleration. During normal vehicle operation of a typical conventional powertrain, as the vehicle decelerates, fuel is typically shut off to the engine, which may be referred to as deceleration fuel cut off (DFCO). During DFCO, the engine continues rotating and as such continues pumping air through the engine and through the exhaust. This allows fuel to be saved and allows the vehicle to be slowed down without using the brakes, which prolongs brake life. According to embodiments disclosed herein, airflow circulation during DFCO may be diverted to a storage tank for pressurization. For example, flow into or out of the storage tank may be controlled by valves. During pressurization, the valves may be controlled to allow the airflow to accumulate in the storage tank, thereby increasing the pressure of the gas collected in the storage tank. The stored high-pressure gas may then be used to purge a prechamber in the engine once vehicle acceleration begins and the engine fueling is turned back on. In such manner, energy may be recovered from deceleration to pump and pressurize gas, thereby avoiding the use of any additional air pump in the system. According to embodiments of the present disclosure, gas may be diverted into and pressurized in a storage tank during DFCO from the engine exhaust line and/or from the engine prechamber. The diverted and pressurized gas may include, for example, air or a mixture of air and other components (e.g., fuel, recirculated exhaust gases, reformates, or gas contaminants).

Figure 1:
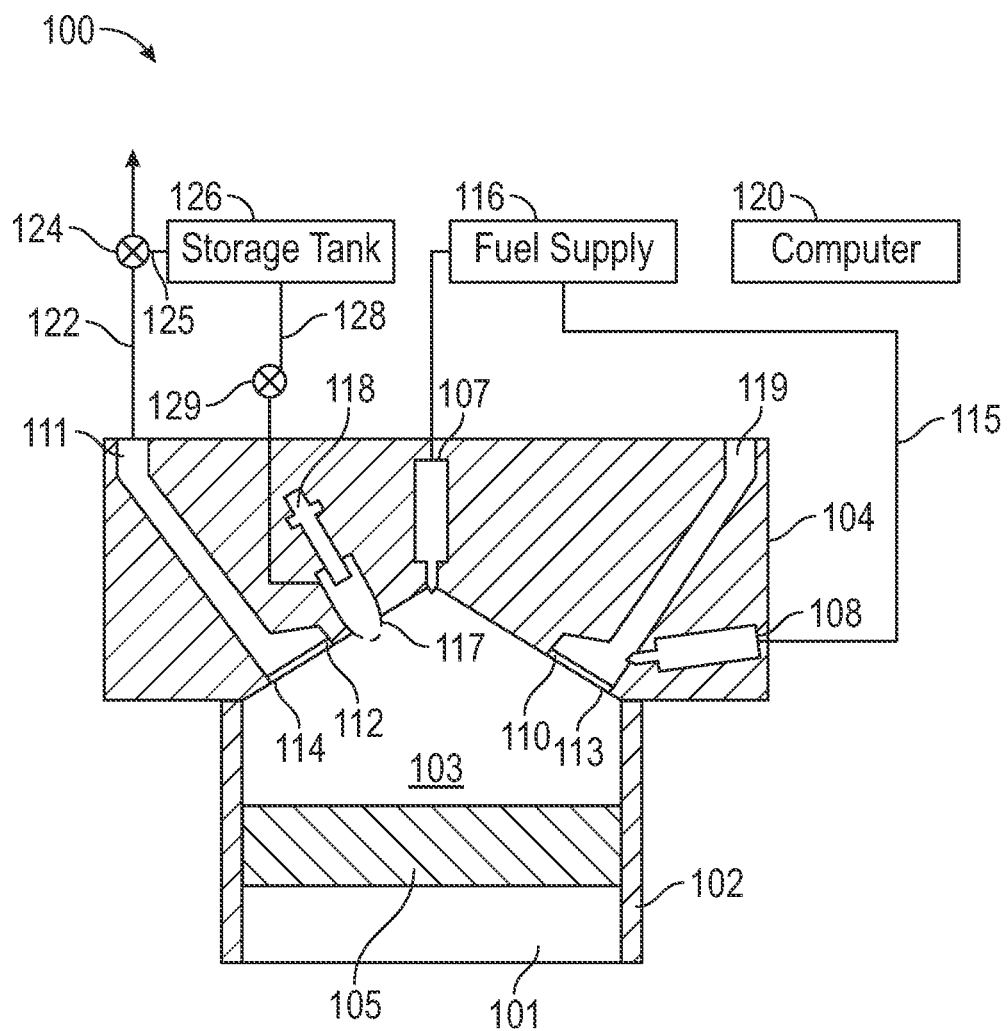
FIG. 1 shows an engine in accordance with one or more embodiments.

Referring to FIG. 1, a combustion system 100 in accordance with embodiments disclosed herein is illustrated. The combustion system 100 may be an internal combustion engine including at least one cylinder 101 formed within an engine body or engine block 102. In FIG. 1, only a portion of the engine block is shown, and only one cylinder in the engine block is shown, although an engine block may have several cylinders. The cylinder 101 may include a combustion chamber 103 of the combustion system 100. Additionally, a cylinder head 104 may be mounted at a top of the cylinder 101 and forms an upper end of the combustion chamber 103. A piston 105 may be arranged inside the cylinder 101 and forms a lower end of the combustion chamber 103. The piston 105 moves up and down inside the cylinder 101 during an engine cycle, and the volume of the combustion chamber 103 changes with the position of the piston 105. Further, the piston 105 may be connected to a crankshaft (not shown) by a connecting rod. The crankshaft may convert the reciprocating motion of the piston 105 into rotary motion, as is well known in the art.

A prechamber 117 may be positioned in fluid communication with the combustion chamber 103. The prechamber 117, in accordance with one or more embodiments, may have a much smaller volume than the combustion chamber 103. For example, in one or more embodiments, the prechamber 117 may have a volume between 0.5 cubic centimeters and 3 cubic centimeters, while the combustion chamber 103 may have a displacement volume greater than 300 cubic centimeters.

The prechamber 117 may have one or more nozzles integrally formed through a wall of the prechamber 117, such that the one or more nozzles provide for fluid communication between the prechamber 117 and the combustion chamber 103. In some embodiments, the nozzles may be formed of nozzle inserts that extend through the prechamber wall to provide fluid communication between the prechamber 117 and the combustion chamber 103. The one or more nozzles are configured to relieve pressure from the prechamber 117 and to convert pressure from the prechamber 117 into high velocity jets, which may assist in igniting the gas in the combustion chamber 103 more rapidly. A spark plug 118 may be connected to and configured to interface with the prechamber 117. The spark plug 118 may be used to ignite fuel within the prechamber 117. In one or more embodiments, a second spark plug (not pictured) may be connected to and configured to interface with the combustion chamber 103.

A fuel injector 107 according to embodiments of the present disclosure may be mounted in the cylinder head 104. A clamp (not pictured) may removably fix the fuel injector 107 to the cylinder head 104. The clamp may be disposed on a top of the fuel injector 107 and be attached to the cylinder head 104 to maintain a position of the fuel injector 107. The fuel injector 107 may be in fluid communication with the combustion chamber 103.

Still referring to FIG. 1, the cylinder head 104 may optionally include a second fuel injector 108 used either alone or in combination with the fuel injector 107. As shown, the cylinder head 104 may include at least one intake passage 119 terminating in a second intake port 110. A second fuel injector 108 may be positioned along the intake passage 119 in a configuration allowing injection of fuel into the intake passage 119. The second fuel injector 108 may be a similar fuel injector as the fuel injector 107. In one or more embodiments, there may also be a fuel injector (not pictured) disposed within the prechamber 117.

Additionally, an intake port 110 may include an intake valve 113 to control opening and closing of the intake port 110. Air flowing through the intake passage 119 to the combustion chamber 103 may be entrained in the fuel spray plume of the second fuel injector 108 when the second fuel injector 108 is injecting fuel. Although not shown, the combustion chamber 103 and the intake passage 119 may be connected to a source of air in a conventional manner. The air in the combustion chamber 103 and the intake passage 119 may be ambient air or a mixture of ambient air and recirculated exhaust gases.

The cylinder head 104 may also include at least one exhaust passage 111 having in an exhaust port 112. An exhaust valve 114 may be arranged to control opening and closing of the exhaust port 112. When the exhaust port 112 is open, exhaust gases can be pushed out of the combustion chamber 103 into the exhaust passage 111. An intake passage 119, an exhaust passage 111 and associated components (e.g., valves 113, 114 and fuel injectors 107, 108) may be provided in the cylinder head 104 for each cylinder in the combustion system 100, such as in the arrangement shown in FIG. 1 for the cylinder 101.

In one or more embodiments, the fuel injector(s) 107, 108 may be used to directly inject fuel into the combustion chamber 103 and/or intake passage 119. The fuel injector(s) 107, 108 may be fluidly connected to a fuel line 115, which is in communication with a fuel supply 116.

In one or more embodiments, a computer 120 may include a control system, such as an engine control unit, which may control an opening and closing of the fuel injector(s) 107, 108 to deliver the fuel into the combustion chamber 103 at desired times during an engine cycle. The control system may also control opening and closing of the intake and exhaust valves 113, 114. In one or more embodiments, the computer 120 may include a processor and a user interface panel at which a user may provide an input, such as a command, to the computer 120.

In some embodiments, a cable (not shown), such as an electrical or hydraulic power cable, may be coupled to the fuel injector(s) 107, 108. The cable may provide power to the fuel injector(s) 107, 108 from a power source (not shown). Additionally, the cable may be connected to the computer 120 to control the fuel injector(s) 107, 108. The computer 120 may include instructions or commands to operate the fuel injector(s) 107, 108 automatically or a user may manually control the computer 120 at a user interface panel (not shown). It is further envisioned that the computer 120 may be connected to an office via a satellite such that a user may remotely monitor conditions and send commands to the fuel injector(s) 107, 108. If leaks and performance issues are found, an alert may be sent to the control system to adjust or turn off the fuel injector(s) 107, 108 manually or automatically.

In one or more embodiments, an exhaust line 122 may be connected to the exhaust passage 111, such that gases may pass from the combustion chamber 103 through the exhaust passage 111 and into the exhaust line 122. An exhaust diversion valve 124 may be installed along the exhaust line 122. A storage tank 126 may be connected to the exhaust diversion valve via a diversion line 125. As such, the storage tank 126 is fluidly connected to the combustion chamber 103. In one or more embodiments, the exhaust diversion valve 124 may be open to the exhaust system (not pictured) but closed to the storage tank 126. In such embodiments, gas from the combustion chamber 103 may flow through the exhaust passage 111 and the exhaust line 122 to the exhaust system. In other embodiments, the exhaust diversion valve 124 may be open to the storage tank 126 and closed to the exhaust system, such that gas from the combustion chamber 103 is routed through the exhaust line 122 and into the storage tank 126. The storage tank 126 is also fluidly connected to the prechamber 117 via a purge line 128. A prechamber valve 129, which may also be referred to as a purge valve, may be disposed between the prechamber 117 and the storage tank 126, e.g., along the purge line 128 or at the junction between the purge line 128 and an opening of the prechamber 117. The prechamber valve 129 may be operated to allow gas flow between the storage tank 126 and the prechamber 117 (in the open configuration) or to prevent gas flow therebetween (in the closed configuration). Gas may flow either from the storage tank 126 to the prechamber 117, or from the prechamber 117 to the storage tank 126 depending on situational needs.

In one or more embodiments, there may be more than one cylinder, each with its own combustion chamber 103 and prechamber 117. The purge line 128 may therefore comprise one or more branch lines (not pictured) connected to each additional prechamber 117, such that all prechambers 117 are connected to the purge line 128. Each additional prechamber 117 may also have a prechamber valve 129 provided along the branch line, allowing for opening and closing of the prechamber 117 to the purge line 128.

Figure 2:
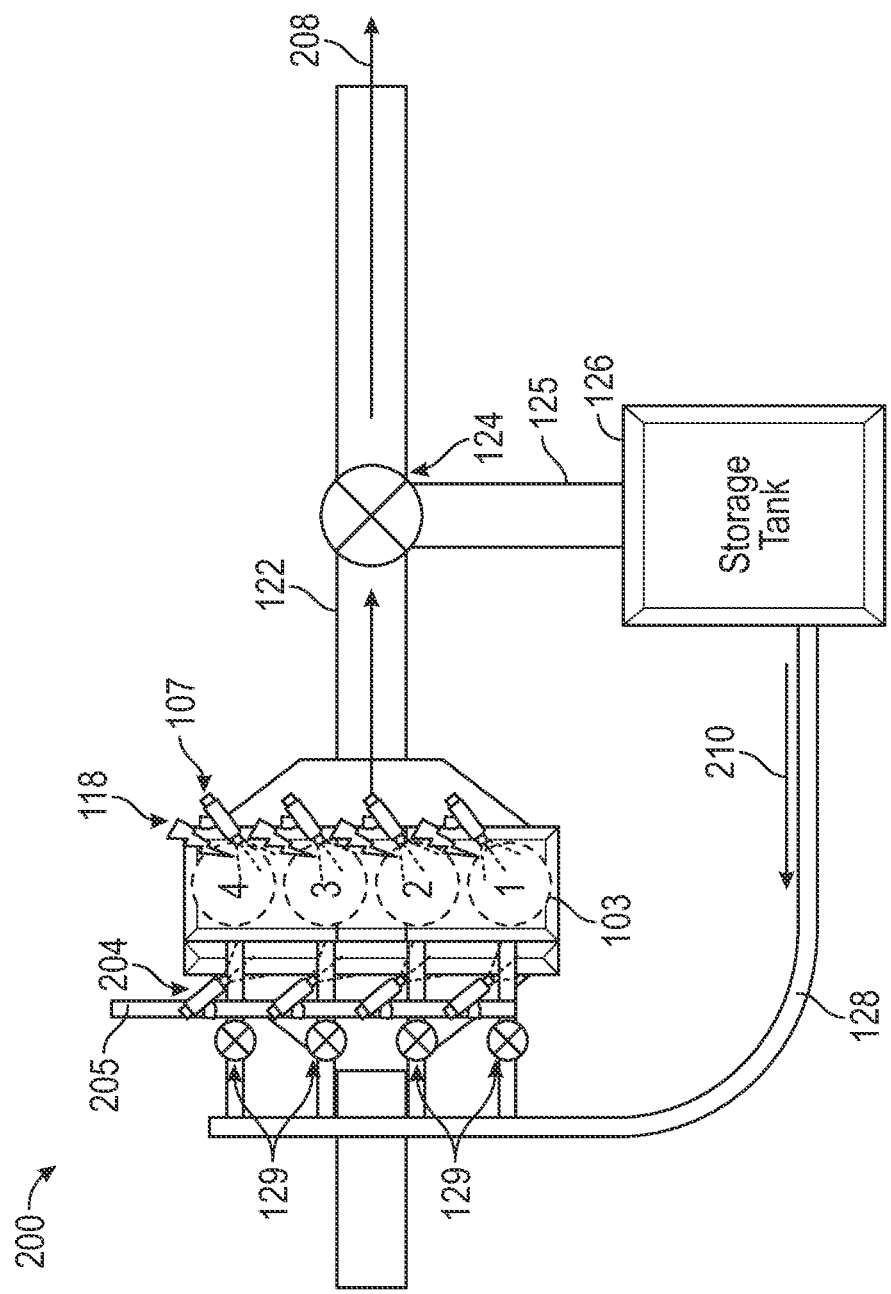
FIG. 2 shows a schematic of an engine in an air usage mode in accordance with one or more embodiments.

Turning now to FIG. 2, FIG. 2 shows a schematic of an engine in an air usage mode in accordance with one or more embodiments. The combustion system 200 may include four cylinders, each having a combustion chamber 103, each provided with a fuel injector 107 and a spark plug 118. Each combustion chamber 103 may also be in fluid communication with a prechamber 117. Each prechamber 117 may have a prechamber fuel injector 204, where the prechamber fuel injectors 204 are installed on a fuel rail 205. A prechamber valve 129 may be installed at an exit of each prechamber 117 and may fluidly connect the prechamber 117 with the purge line 128.

The combustion system 200 may be in air usage mode. An air usage mode, in accordance with one or more embodiments, may use air from the storage tank 126 to purge each prechamber 117. In the air usage mode, the spark plugs 118, fuel injectors 107, and prechamber fuel injectors 204 may all be active. In the air usage mode, the exhaust diversion valve 124 may be closed to the storage tank 126, allowing burned exhaust gases 208 to flow directly through the exhaust line 122 to the exhaust system (not pictured). The storage tank 126 may be pressurized with a gas. In one or more embodiments, the gas may be pure air. The prechamber valve 129 may be a check valve and may be configured to open when the storage tank 126 has been pressurized to a desired pressure. After the pressure has exceeded this desired pressure, the prechamber valve 129 may open, allowing gas to flow through the purge line 128 to the prechambers 117, reducing the pressure in the storage tank 126. As such, the prechamber valves 129 may open on a cyclical basis to allow for building of prechamber 117 pressure and discharging of that pressure. For example, the prechamber valve 129 may be opened at some point during or after the exhaust stroke, after combustion has occurred. Further, the prechamber valve 129 may be closed at some point during or before the compression stroke of the engine, before ignition occurs. In one or more embodiments, decreasing the pressure in the storage tank 126 may be referred to as discharging the storage tank 126. In one or more embodiments, the gas may be referred to as prechamber scavenge airflow 210. The total volume of gas required to purge the prechambers 117 may be less than 3% of the total engine airflow.

Figure 3:
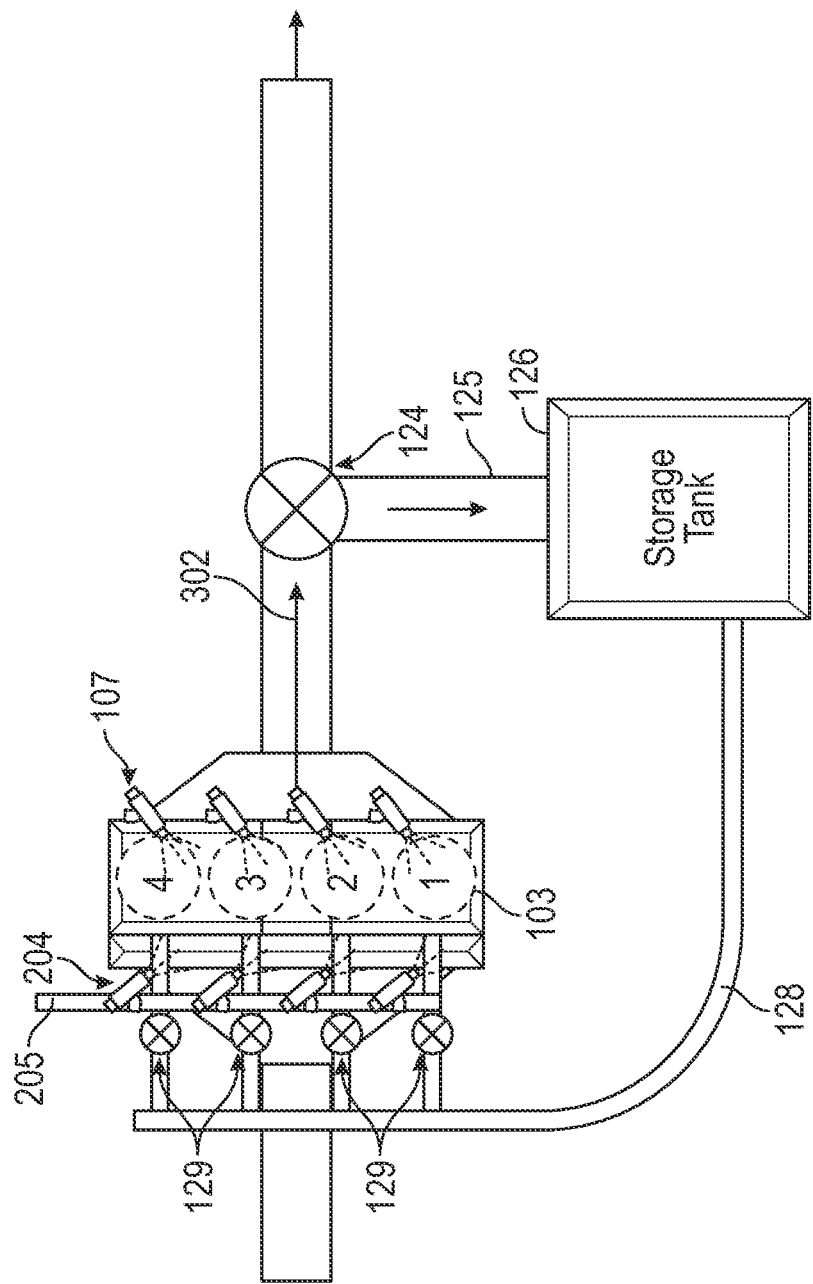
FIG. 3 shows a schematic of an engine in an air storage mode in accordance with one or more embodiments.

FIG. 3 shows a schematic of an engine in an air storage mode in accordance with one or more embodiments. An air storage mode, in accordance with one or more embodiments, may pressurize the storage tank 126 using air from the combustion chamber 103. The air storage mode may be active during a deceleration fuel cut off (DFCO) period, or during a hybrid motoring period. In hybrid motoring embodiments, a hybrid motor (not pictured) may be coupled to the combustion system 200.

In comparison to the combustion system 200 during the air usage mode, in air storage mode, the exhaust valve 124 may be open to the storage tank 126 and closed to the exhaust system. Further, the spark plug 118, the fuel injector 107, and the prechamber fuel injector 204 may be inactive, and the prechamber valves 129 may be closed. Air 302 may be directed from the combustion chambers 103 through the exhaust line 122, the exhaust diversion valve 124 and the diversion line 125 into the storage tank 126. In one or more embodiments, since the prechamber valve 129 is closed, the pressure within the storage tank 126 may increase. In an air storage mode, no prechamber scavenge airflow 210 travels through the purge line 128 due to the closure of the prechamber valve 129. In one or more embodiments, increasing the pressure in the storage tank 126 may be referred to as pressurizing the storage tank 126 or charging the storage tank 126.

According to embodiments of the present disclosure, a storage tank 126 may be pressurized using airflow from the engine exhaust line 122 and/or from the purge line 128. Airflow may be provided from the purge line 128 and stored in the storage tank 126 by directing air from the combustion chamber 103 and through the prechamber 117, e.g., from a compression stroke of the piston. In some embodiments, gas may be diverted and stored in a storage tank using only gas diverted via the purge line 128 (and not from the exhaust line 122). When gas is diverted via the purge line 128 to be stored in the storage tank, such airflow may be referred to herein as being in reverse flow.

Figure 4:
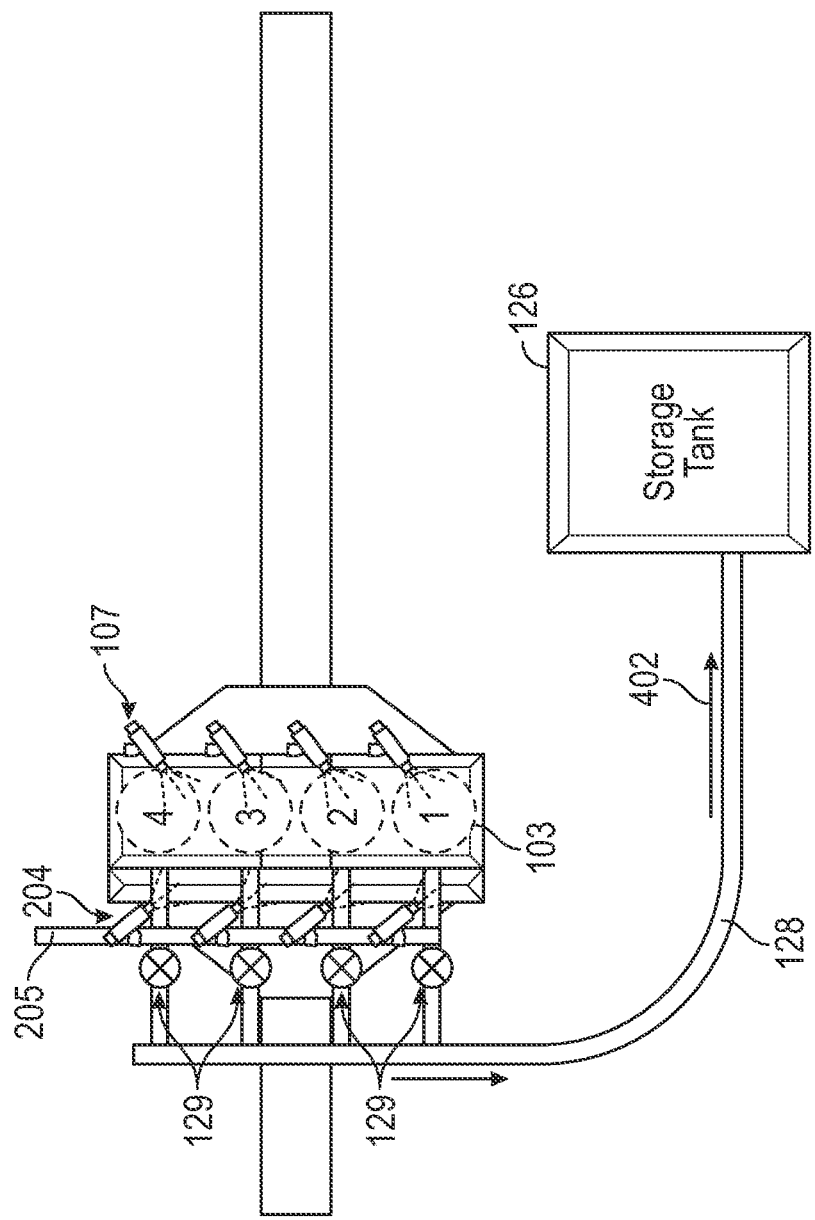
FIG. 4 shows a schematic of an engine in an air storage mode with reverse flow in accordance with one or more embodiments.

FIG. 4 shows a schematic of an engine in an air storage mode using reverse flow in accordance with one or more embodiments. In reverse flow embodiments, the storage tank 126 may be pressurized using reverse prechamber airflow 402 from the prechambers 117 which may flow through the purge line 128 and into the storage tank 126. In such embodiments, the prechamber valves 129 may be open, though the spark plug 118, the fuel injector 107, and the prechamber fuel injector 204 may be inactive. Similar to DCFO air storage modes, the pressure in the storage tank 126 may increase as more reverse prechamber airflow 402 is directed through the purge line 128.

Figure 5:
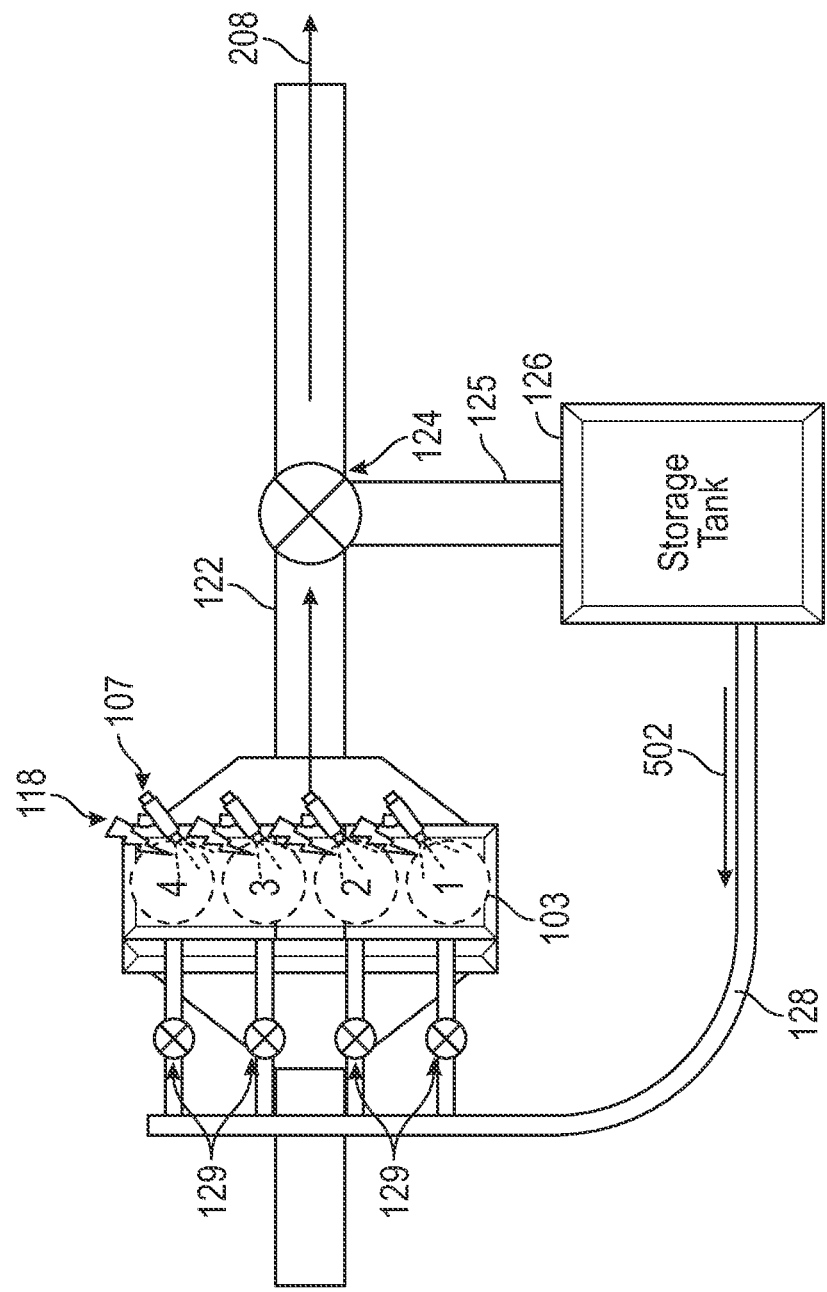
FIG. 5 shows a schematic of an engine in an air and fuel usage mode in accordance with one or more embodiments.

FIG. 5 shows a schematic of an engine in an air and fuel usage mode in accordance with one or more embodiments. In the air and fuel usage mode, the spark plug 118 and fuel injector 107 may be active. In the air and fuel usage mode, the exhaust diversion valve 124 may be closed to the storage tank 126, allowing burned exhaust gases 208 to flow directly through the exhaust line 122 to the exhaust system (not pictured). The storage tank 126 may be pressurized with an air fuel mixture 502. In one or more embodiments, the prechamber valve 129 may be open on a cyclic basis, allowing the air fuel mixture 502 to flow through the purge line 128 and into the prechambers 117. As the air fuel mixture flows into the prechambers 117, the prechambers 117 are purged. The prechamber valve 129 may be opened at some point during or after the exhaust stroke, after combustion has occurred. The prechamber valve 129 may be closed at some point during or before the compression stroke of the engine, before ignition occurs. Further, as the air fuel mixture 502 flows out of the storage tank 126, the pressure in the storage tank 126 may slowly decrease.

Figure 6:
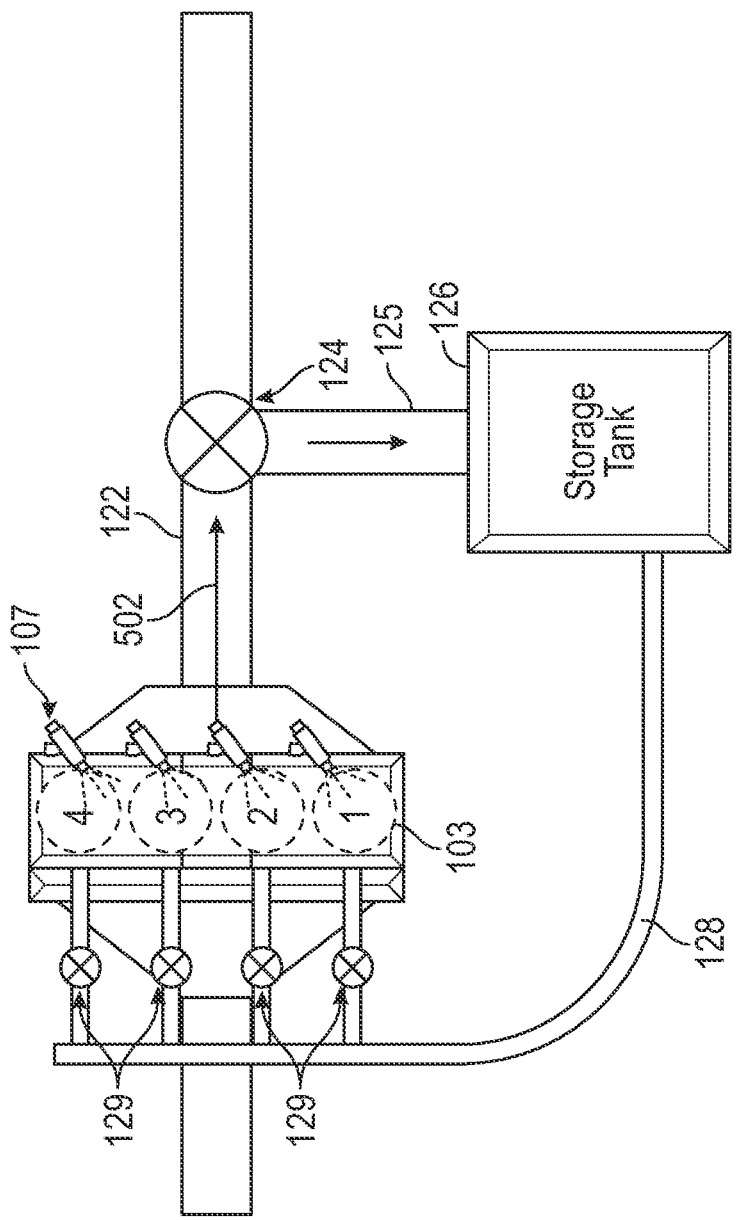
FIG. 6 shows a schematic of an engine in an air and fuel storage mode in accordance with one or more embodiments.

FIG. 6 shows a schematic of an engine in an air and fuel storage mode in accordance with one or more embodiments. Similar to the air storage mode described in FIG. 3, an air and fuel storage mode, in accordance with one or more embodiments, may pressurize the storage tank 126 using an air fuel mixture 502 from the combustion chamber 103. The air and fuel storage mode may be active during a deceleration fuel cut off (DFCO) period, or during a hybrid motoring period. In one or more embodiments, the spark plug 118 may be inactive and the prechamber valves 129 may be closed. However, the fuel injector 107 may be active and supplying the combustion chamber 103 with fuel. An air fuel mixture 602 may be directed from the combustion chamber 103 through the exhaust line 122, the exhaust diversion valve 124, and the diversion line 125. In one or more embodiments, the check valve of the storage tank 126 may be closed, such that the pressure in the storage tank 126 increases rapidly as the air fuel mixture 502 flows from the diversion line 125 into the storage tank 126.

Use of air and fuel storage and usage modes can be implemented together in order to allow for elimination of the prechamber fuel injectors 204. Fueling of each combustion chamber 103 may be accomplished using the fuel injectors 107 during DFCO periods or hybrid motoring periods. This fuel is not ignited, due to the inactive spark plugs 118. Instead, the unburned, premixed air fuel mixture 502 may be held in the storage tank 126, before being injected directly into the prechambers 117 through the purge line 128. As such, since the prechambers 117 are fueled by the air fuel mixture 502, there is no need for any prechamber fuel injectors 204 to be active in order to provide enough air fuel mixture to appropriately fill the prechambers 117.

Embodiments described herein may also include on-board fuel reforming. In one or more embodiments, fuel reforming refers to an incomplete combustion reaction of hydrocarbon fuel which mainly produces hydrogen and carbon monoxide. Both hydrogen and carbon monoxide are beneficial to combustion in that they may increase flame speed and stability. In one or more embodiments, fuel reforming solutions may require a reforming catalyst. However, there are also embodiments in which fuel reforming processes may be performed in the engine with a negative valve overlap. Reformate products may improve prechamber combustion characteristics, further increasing the overall system efficiency. The storage tank 126, in accordance with one or more embodiments, may be recharged by a temporary engine operation switch (e.g., in-cylinder reforming) and diversion of exhaust gases to the storage tank 126 while maintaining the required brake torque. In other embodiments, the storage tank 126 may also be charged through a DFCO or hybrid monitoring event.

Figure 7:
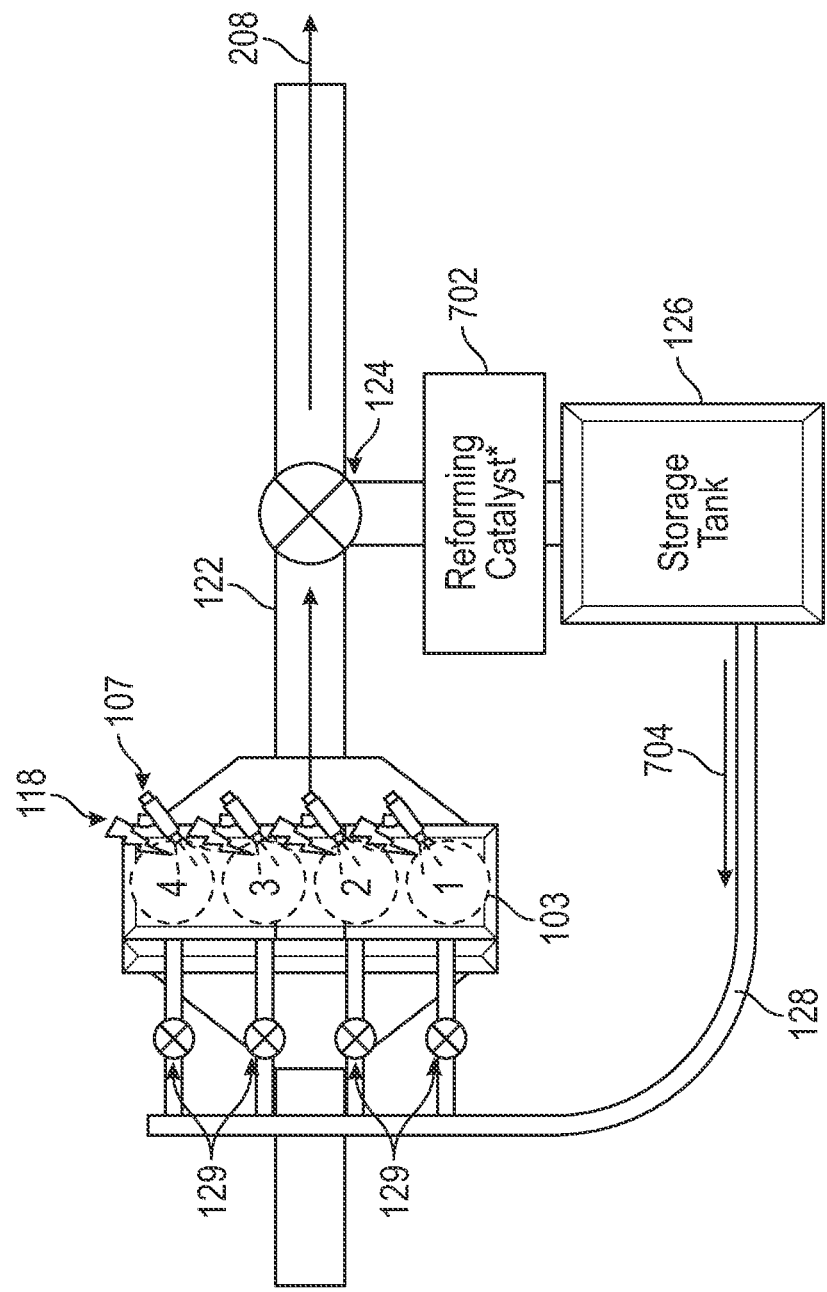
FIG. 7 shows a schematic of an engine in a reformate usage mode in accordance with one or more embodiments.

FIG. 7 shows a schematic of an engine in a reformate usage mode in accordance with one or more embodiments. Similar to both the air usage mode and the air fuel usage mode, the reformate usage mode may be performed while the spark plugs 118 and the fuel injectors 107 are active and while the prechamber valves 129 are in an open portion of the cylinder cycle. The exhaust diversion valve 124 may be open to the exhaust system and closed to the storage tank 126. A reforming catalyst 702 may be disposed along the diversion line 125, between the exhaust diversion valve 124 and the storage tank 126. In one or more embodiments, the reforming catalyst 702 may be used to perform reforming processes. The storage tank 126 may be pressurized with a reformate mixture 704. The reformate mixture 704 may flow from the storage tank 126 and through the purge line 128 and the prechamber valves 129 into the prechambers 117. Flow of the reformate mixture 704 may purge the prechambers 117. The prechamber valve 129 may be opened at some point during or after the exhaust stroke, after combustion has occurred. The prechamber valve 129 may be closed at some point during or before the compression stroke of the engine, before ignition occurs.

Figure 8:
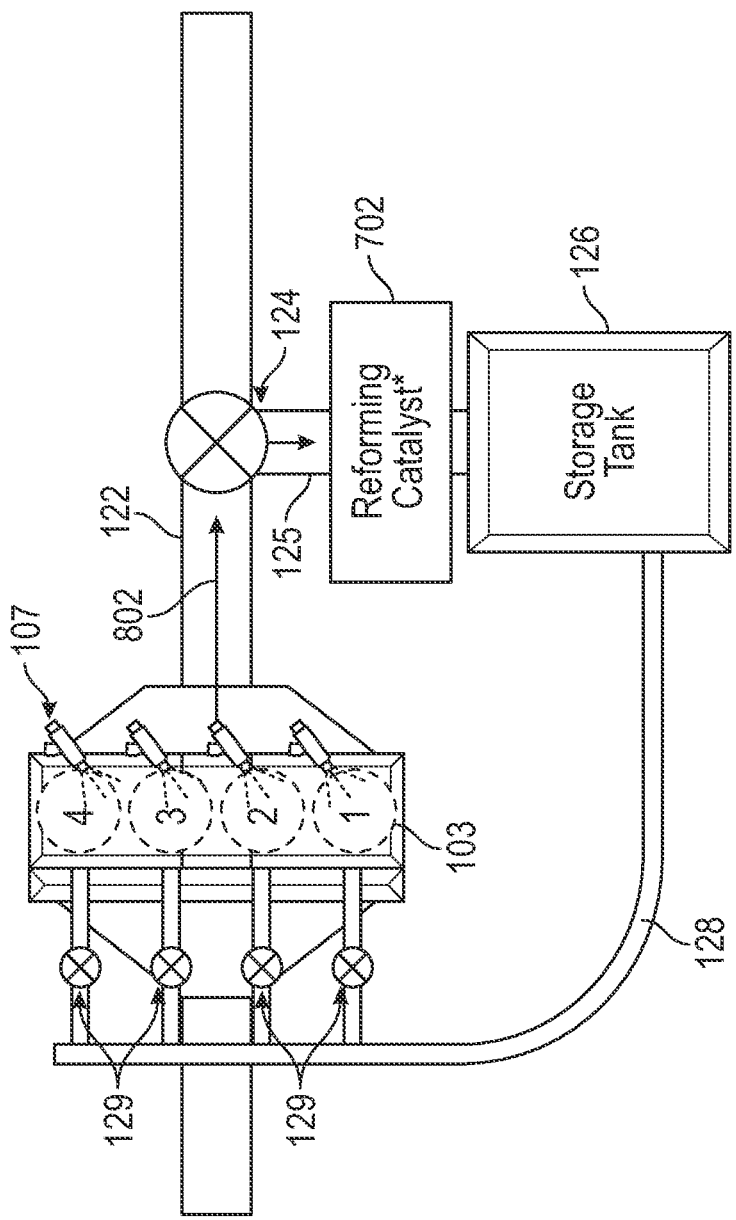
FIG. 8 shows a schematic of an engine in a reformate storage mode in accordance with one or more embodiments.

FIG. 8 shows a schematic of an engine in a reformate storage mode in accordance with one or more embodiments. Similar to both air storage mode and the air fuel storage mode, the reformate storage mode may be performed during a DFCO period or during a hybrid motoring period. The spark plugs 118 may be inactive and the prechamber valves 129 may be closed. However, the fuel injectors 107 may be activated and may fuel the combustion chambers 103. The exhaust diversion valve 124 may be open to the storage tank 126 and closed to the exhaust system.

In one or more embodiments, an air fuel mixture 802 may be directed through the exhaust line 122, the exhaust diversion valve 124, and the diversion line 125 into the reforming catalyst 702. The reforming catalyst 702 may convert the air fuel mixture 802 into a reformate mixture, such as reformate mixture 704. The reformate mixture may flow from the reforming catalyst 702 into the storage tank 126. The prechamber valve 129 may be closed, such that the pressure in the storage tank 126 increases as the reformate mixture flows into the storage tank 126.

Figure 9:
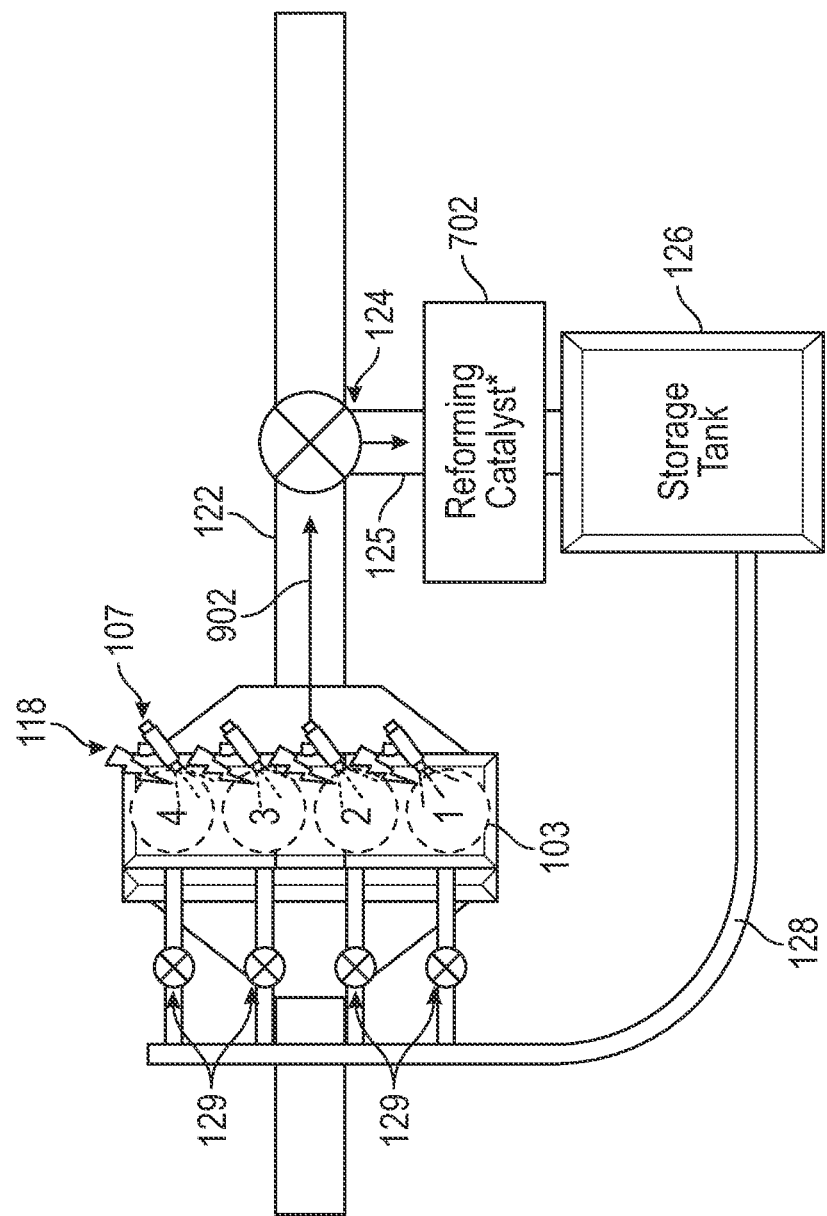
FIG. 9 shows a schematic of an engine in a reformate storage mode in accordance with one or more embodiments.

FIG. 9 shows a schematic of an engine in a reformate storage mode in accordance with one or more embodiments. A reformate storage mode may also be performed during a non-DFCO period or a non-hybrid motoring period. In such embodiments, engine torque output may be maintained. In one or more embodiments, the spark plugs 118 and the fuel injectors 107 may be active, and a reformate mixture 902 may flow from the combustion chambers 103 to the reforming catalyst 702 via the exhaust line 122, the exhaust diversion valve 124, and the diversion line 125. The reformate mixture 902 may flow from the reforming catalyst to the storage tank 126. In one or more embodiments, the check valve of the storage tank 126 may be closed, allowing for increasing pressure within the storage tank 126.

Figure 10:
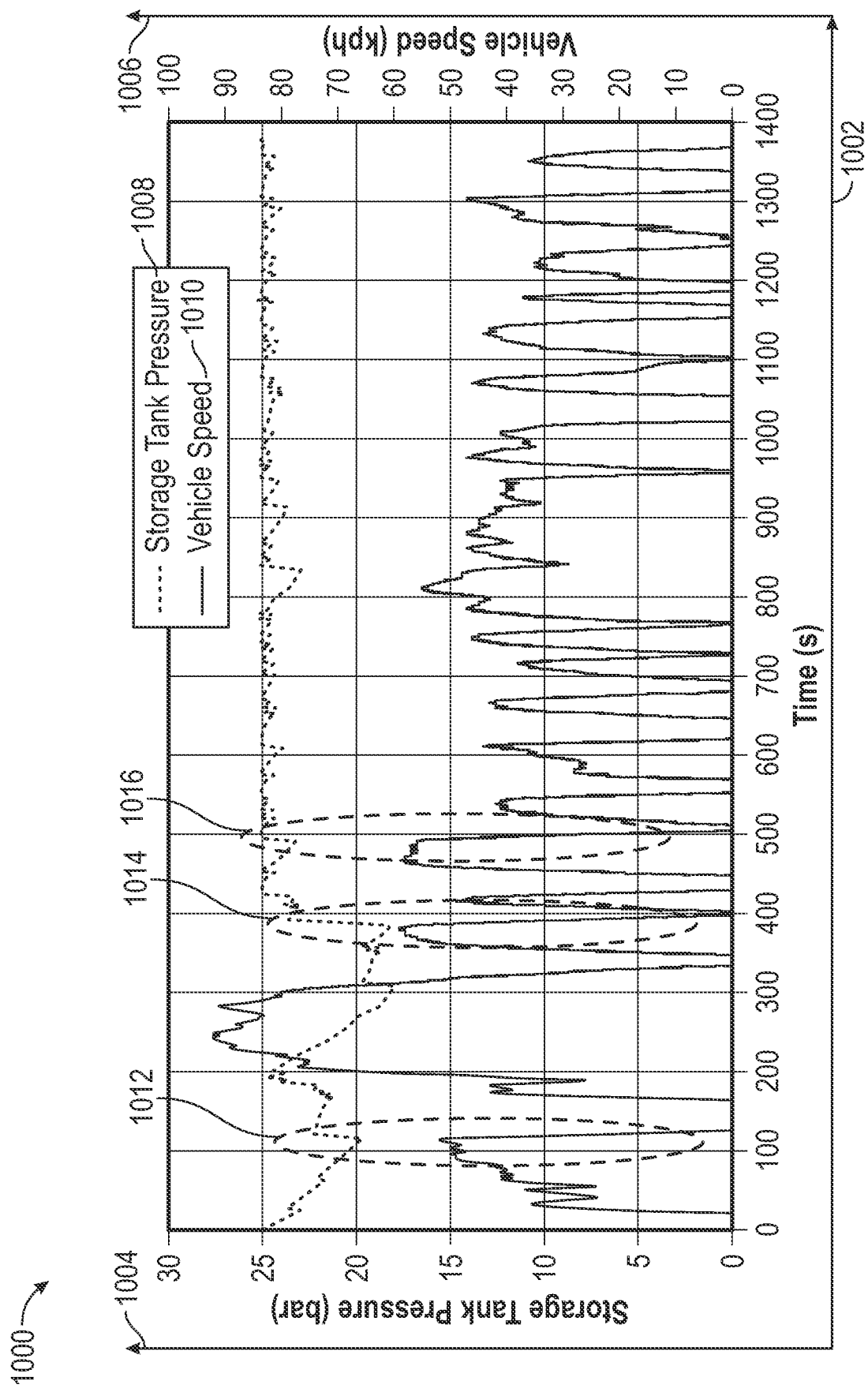
FIG. 10 shows a graphical representation of analytical prediction of storage tank pressure during normal operation in accordance with one or more embodiments.

Turning now to FIG. 10, FIG. 10 shows a graphical representation of analytical prediction of storage tank pressure during normal operation in accordance with one or more embodiments. In one or more embodiments, the plot 1000 may have a horizontal axis 1002, which may display time in seconds. A first vertical axis 1004 may represent storage tank pressure in bar, and a second vertical axis 1006 may represent vehicle speed in kilometers per hour. Line 1008 may show variation in storage tank pressure and line 1010 may show variation in vehicle speed. As shown in areas of interest 1012, 1014, and 1016, as vehicle speed decreases (i.e., when the engine is operating in a DFCO period), storage tank pressure increases. In other words, during vehicle speed decreases, the engine may operate in a storage mode, e.g., an air storage mode, an air and fuel storage mode, or a reformate mode, where the storage tank 126 is pressurized.

Further, as vehicle speed increases, storage tank pressure decreases, since the engine may be operating in a usage mode, e.g., an air usage mode, an air and fuel usage mode, or a reformate usage mode. In one or more embodiments, the pressure of the storage tank 126 during periods of decreasing vehicle speed may increase at a higher rate than the pressure of the storage tank 126 during periods of increasing vehicle speed. For example, the storage tank 126 may be pressurized, or charged, more than 33 times faster than the storage tank 126 is discharged. In one or more embodiments, 10 seconds of vehicle deceleration (and pressurization of the storage tank 126) may be required to allow for 5-6 minutes of driving (and discharging of the storage tank 126).

In one or more embodiments, plot 1000 may be produced based on a number of assumptions. For example, one assumption may include that air is only added to the storage tank 126 when the internal pressure falls below 25 bar. Further, the total air storage volume of the storage tank 126 may be 6 liters. Prechamber airflow, in one or more embodiments, may be 3% of the total engine airflow. Plot 1000 may also include a negative impact of DFCO time in the first 400 seconds of the test due to cold start warm-up. In one or more embodiments, engine DFCO time may be limited during a cold start to keep a three way catalyst warm. Further, plot 1000 may be developed based on a FTP certification (EPA federal test procedure) cycle of 2.0T Buick Regal.

Figure 11:
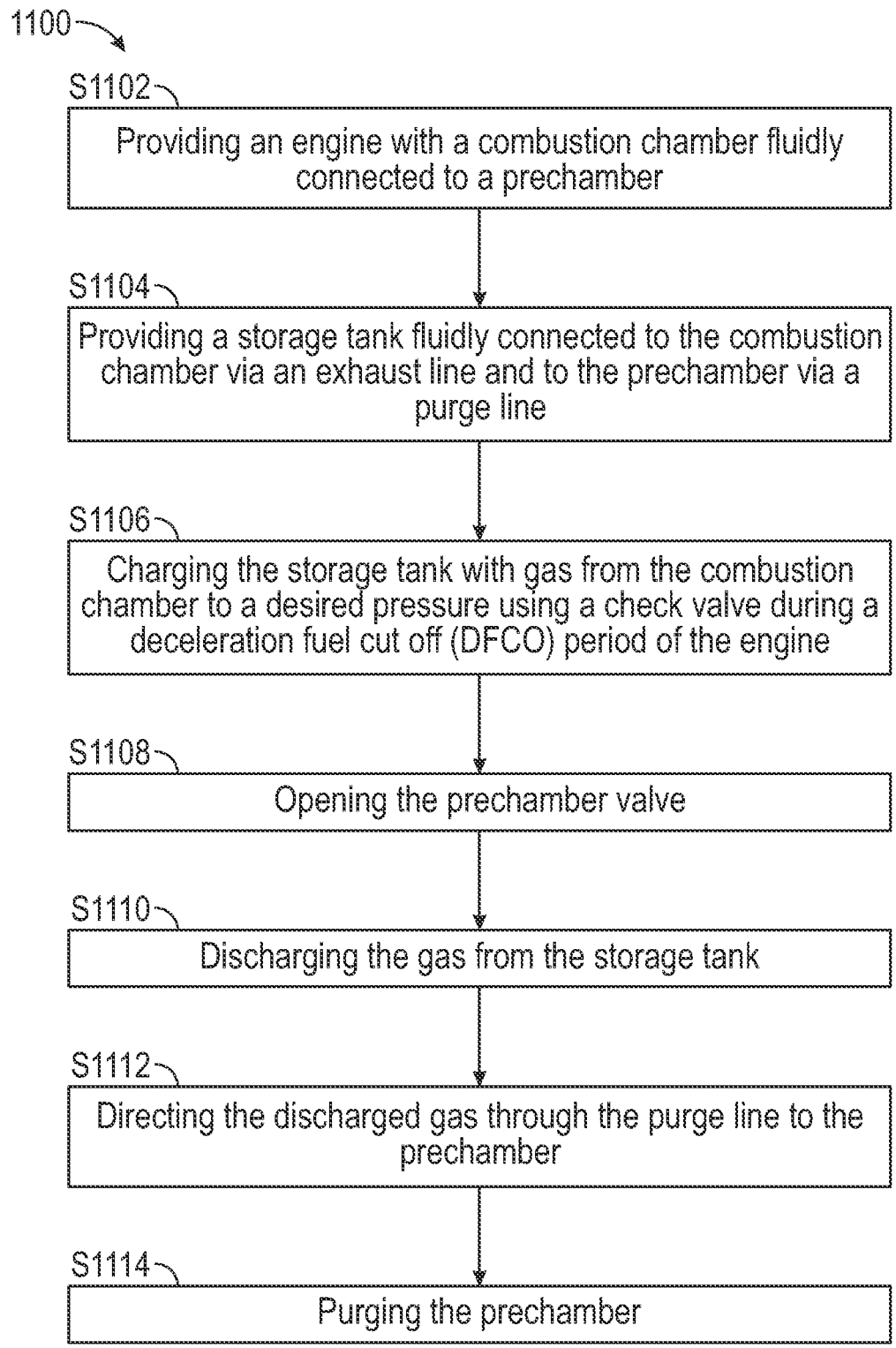
FIG. 11 shows a flowchart of a method in accordance with one or more embodiments.

Though plot 1000 was developed using a number of assumptions, these assumptions are not required for embodiments disclosed herein. These are merely examples, and there are many different assumptions which may be used to develop similar plots and to implements embodiments of methods and systems described herein, FIG. 11 depicts a flowchart in accordance with one or more embodiments. More specifically, FIG. 11 depicts a flowchart 1100 of a method of purging a prechamber according to embodiments of the present disclosure. Further, one or more blocks in FIG. 11 may be performed by one or more components as described in FIGS. 1-10. While the various blocks in FIG. 11 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, an engine may be provided, where the engine includes a combustion chamber 103 fluidly connected to a prechamber 117, S1102. In one or more embodiments, the engine may include four cylinders, each having a combustion chamber 103 and a prechamber 117. The engine may further include an exhaust line 122 fluidly connected to the combustion chamber 103 via an exhaust port 112. Next, a storage tank 126 may be provided, where the storage tank 126 is fluidly connected to the combustion chamber 103 via an exhaust line 122 and to the prechamber 117 via a purge line 128, S1104.

The storage tank 126 may be charged with gas from the combustion chamber 103 to a desired pressure using a check valve during a deceleration fuel cut off (DFCO) period of the engine, S1106. In one or more embodiments, the gas may be fresh air 302. In other embodiments, the gas may be an air fuel mixture 502. In yet other embodiments, the gas may be a reformate mixture 703, 902. Charging the storage tank 126 with gas may include using an exhaust diversion valve 124 to direct gas flowing through the exhaust line 122 to the storage tank 126 via a diversion line 125. Charging the storage tank 126 may alternatively include using a prechamber valve 129 to direct the gas flowing through the prechamber 117 during a compression stoke of the engine through the purge line 128 to the storage tank 126. In one or more embodiments, the storage tank 126 may also be charged during one or more non-DFCO periods of the engine with combustion gas pumped from the combustion chamber 103 to the storage tank 126 by a hybrid motor. In addition, charging the storage tank 126 may also include injecting fuel into the combustion chamber 103 during a DFCO period without igniting the fuel, creating an air fuel mixture. Further, after charging the storage tank 126, the exhaust diversion valve 124 may close flow to the diversion line 125 and allow flow to exit the combustion chamber 103 through the exhaust line 122 to the exhaust system.

Next, the prechamber valve 129 may be opened, S1108. In one or more embodiments, opening of the prechamber valve 129 may be triggered once the storage tank 126 has been charged to a desired pressure. Opening the prechamber valve 129 may allow the gas to leave the storage tank 126, causing discharging of the storage tank 126, S1110. In one or more embodiments, charging the storage tank 126 may be 33 times faster than discharging the gas from the storage tank 126. The discharged gas may be directed through the purge line 128 to the prechamber 117, S1112. As the discharged gas enters the prechamber 117, the prechamber 117 is purged, S1114. The method displayed in flowchart 1100 may also include recharging the storage tank 126 during a second DFCO period of the engine.

Figure 12:
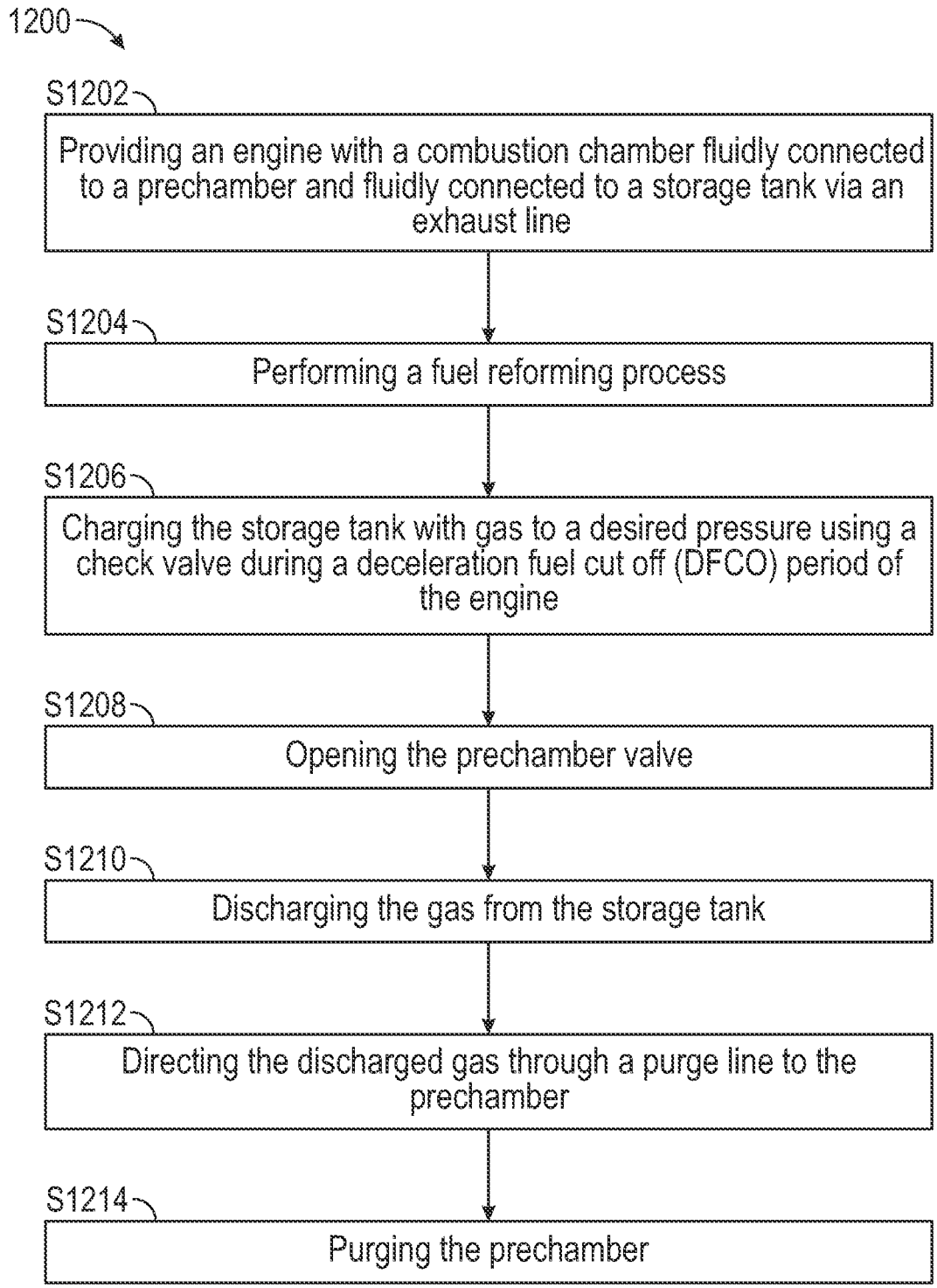
FIG. 12 shows a flowchart of a method in accordance with one or more embodiments.

FIG. 12 depicts a flowchart in accordance with one or more embodiments. More specifically, FIG. 12 depicts a flowchart 1200 of a method of purging a prechamber according to embodiments of the present disclosure. Further, one or more blocks in FIG. 12 may be performed by one or more components as described in FIGS. 1-10. While the various blocks in FIG. 12 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, an engine may be provided, where the engine includes a combustion chamber 103 fluidly connected to a prechamber 117 and fluidly connected to a storage tank 126 via an exhaust line 122, S1202. Next, a fuel reforming process may be performed, S1204. In one or more embodiments, the fuel reforming process may be performed by directing a gas through a reforming catalyst 702 fluidly connected between an exhaust diversion valve 124 and the storage tank 126 along the diversion line 125. In other embodiments, the fuel reforming process may be performed in the combustion chamber 103 as a part of an in-cylinder fuel reforming process.

Next, the storage tank 126 may be charged with gas to a desired pressure using a check valve during a DFCO period of the engine, S1206. In one or more embodiments, the gas may be an air fuel mixture or a reformate mixture.

Next, a prechamber valve 129, positioned along a purge line 128, may be opened, S1208. In one of more embodiments, opening of the prechamber valve 129 may be triggered once the storage tank 126 has been charged to a desired pressure. Opening the prechamber valve 129 may allow the gas to leave the storage tank 126, causing discharging of the storage tank 126, S1210. In one or more embodiments, charging the storage tank 126 may be 33 times faster than discharging the gas from the storage tank 126. The discharged gas may be directed through the purge line 128 to the prechamber 117, S1212. As the discharged gas enters the prechamber 117, the prechamber 117 is purged, S1214.

Embodiments of the present disclosure may provide at least one of the following advantages. Increasing dilution tolerance can improve engine efficiency due to reduced pumping, heat transfer, and gas property losses while also reducing NOx emissions due to reduced combustion temperature. An air scavenged prechamber with fuel and/or reformate injection may be used to enhance the ignitibility of the mixture inside a prechamber during high EGR stoichiometric operation, which significantly improves the dilution tolerance of the combustion chamber combustion process. Advantageously, embodiments disclosed herein may provide a system to operate an active prechamber with air/fuel/reformate injection with a minimal amount of additional components (e.g., without a purge pump or compressor (to increase the air pressure so that it can purge the prechamber) and without prechamber fuel injectors). Such systems may increase efficiency in the engine and reduce costs. For example, use of an additional pump or compressor may add significant cost and increase parasitic losses due to the compression of the air to the required pressure. Use of additional fuel injectors would also add additional complexity and cost (injectors, fuel rail, etc.) and pose a challenge for fuel vaporization and impingement when the engine is cold.

Further, systems in accordance with embodiments described herein allow for much higher scavenge air pressure, improving the benefit provided by purging the prechamber (i.e., lowering the exhaust gas residual dilution tolerance).

Charging the storage tank through the exhaust diversion valve and/or reverse flow have inherent advantages. For example, charging the storage tank via the exhaust diversion valve allows for rapid filling of the storage tank. Therefore, comparatively short DFCO times are required in order to keep the system 'charged'. In comparison, reverse flow systems may be provided without storage tank connection to the exhaust line and without an exhaust diversion valve, thereby simplifying the system.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. An engine system, comprising:
    an engine, comprising:
        a combustion chamber comprising an intake port and an exhaust port;
        a piston movably disposed in the combustion chamber;
        a prechamber adjacent to and in fluid communication with the combustion chamber;
    an exhaust line fluidly connected to the exhaust port;
    a storage tank fluidly connected to the prechamber via a purge line;
    a prechamber valve provided along the purge line; and
    a diversion line fluidly connecting the exhaust line to the storage tank via an exhaust diversion valve.

2. The engine system of claim 1, wherein a reforming catalyst is disposed along the diversion line between the exhaust diversion valve and the storage tank.

3. The engine system of claim 1, wherein the combustion chamber is formed in a first cylinder in an engine block of the engine, and wherein the engine further comprises:
    at least one additional cylinder;
    an additional combustion chamber formed in each of the at least one additional cylinder; and
    an additional prechamber adjacent to and in fluid communication with the additional combustion chamber,
    wherein the purge line comprises a branch line fluidly connected to the additional prechamber, and
    wherein an additional prechamber valve is provided along the branch line.

4. The engine system of claim 1, wherein the prechamber valve is a check valve.

5. The engine system of claim 1, further comprising a hybrid motor configured to move the piston within the combustion chamber.

6. A method, comprising:
    providing an engine with a combustion chamber fluidly connected to a prechamber;
    providing a storage tank fluidly connected to the prechamber via a purge line;
    charging the storage tank with gas from the combustion chamber to a desired pressure using a prechamber valve during a deceleration fuel cut off (DFCO) period of the engine;
    opening the prechamber valve;
    discharging the gas from the storage tank;
    directing the discharged gas through the purge line to the prechamber; and
    purging the prechamber.

7. The method of claim 6, wherein the engine further comprises an exhaust line fluidly connected to the combustion chamber via an exhaust port and fluidly connected to the storage tank via a diversion line, and wherein charging the storage tank with gas comprises using an exhaust diversion valve to direct gas flowing through the exhaust line to the storage tank via the diversion line.

8. The method of claim 7, further comprising:
injecting fuel into the combustion chamber during the DFCO period of the engine without igniting the fuel, wherein the gas from the engine comprises an air fuel mixture; and
after charging the storage tank, moving the exhaust diversion valve to close flow to the diversion line and allow flow to exit through the exhaust line.

9. The method of claim 6, wherein charging the storage tank with gas comprises using the prechamber valve to direct the gas flowing through the prechamber during a compression stoke of the engine through the purge line to the storage tank.

10. The method of claim 9, wherein the gas comprises fresh air.

11. The method of claim 6, wherein the gas comprises an air fuel mixture.

12. The method of claim 6, further comprising charging the storage tank during one or more non-DFCO periods of the engine with combustion gas pumped from the combustion chamber to the storage tank by a hybrid motor.

13. The method of claim 6, further comprising recharging the storage tank during a second DFCO period of the engine.

14. The method of claim 6, wherein charging the storage tank is faster than discharging the gas from the storage tank.

15. The method of claim 6, further comprising:
fueling one or more cylinders of the engine during the DFCO period of the engine to produce an unburned, premixed air fuel mixture;
directing the unburned, premixed air fuel mixture to the storage tank through an exhaust line and an exhaust diversion valve to the storage tank;
holding the unburned, premixed air fuel mixture in the storage tank; and
injecting the unburned, premixed air fuel mixture into the prechamber via the purge line.

16. A method, comprising:
providing an engine with a combustion chamber fluidly connected to a prechamber and fluidly connected to a storage tank via an exhaust line;
performing a fuel reforming process;
charging the storage tank with gas to a desired pressure using a prechamber valve during a deceleration fuel cut off (DFCO) period of the engine;
opening the prechamber valve;
discharging the gas from the storage tank;
directing the gas through a purge line to the prechamber; and
purging the prechamber.

17. The method of claim 16, wherein performing the fuel reforming process comprises directing the gas through a reforming catalyst fluidly connected between an exhaust diversion valve and the storage tank along a diversion line.

18. The method of claim 16, wherein performing the fuel reforming process comprises performing an in-cylinder fuel reforming process.

19. The method of claim 16, wherein the gas is an air fuel mixture or a reformate mixture.

* * * * *